United States Patent
Muttik

(10) Patent No.: US 10,044,739 B2
(45) Date of Patent: Aug. 7, 2018

(54) FREQUENCY-BASED REPUTATION

(71) Applicant: McAfee, LLC, Plano, TX (US)

(72) Inventor: Igor Muttik, Berkhamsted (GB)

(73) Assignee: McAfee, LLC., Plano, TX (US)

(*) Notice: Subject to any disclaimer, the term of this patent is extended or adjusted under 35 U.S.C. 154(b) by 0 days.

(21) Appl. No.: 15/039,756

(22) PCT Filed: Dec. 27, 2013

(86) PCT No.: PCT/US2013/077935
§ 371 (c)(1),
(2) Date: May 26, 2016

(87) PCT Pub. No.: WO2015/099756
PCT Pub. Date: Jul. 2, 2015

(65) Prior Publication Data
US 2017/0006049 A1  Jan. 5, 2017

(51) Int. Cl.
*H04L 29/06* (2006.01)
*G06F 21/56* (2013.01)

(52) U.S. Cl.
CPC .......... *H04L 63/1416* (2013.01); *G06F 21/56* (2013.01); *H04L 63/1425* (2013.01)

(58) Field of Classification Search
CPC .. H04L 63/1416; H04L 63/1425; G06F 21/56
See application file for complete search history.

(56) References Cited

U.S. PATENT DOCUMENTS

| 5,987,610 | A | 11/1999 | Franczek et al. |
| 6,073,142 | A | 6/2000 | Geiger et al. |
| 6,460,050 | B1 | 10/2002 | Pace et al. |
| 7,506,155 | B1 | 3/2009 | Stewart et al. |
| 7,519,997 | B2 * | 4/2009 | Shipp .................... G06F 21/562 713/187 |

(Continued)

FOREIGN PATENT DOCUMENTS

| JP | 2003186687 A | 7/2003 |
| JP | 2012048342 A | 3/2012 |

(Continued)

OTHER PUBLICATIONS

Supplementary European Search Report issued in EP Application No. EP13900232 dated Apr. 19, 2017; 9 pages.

(Continued)

*Primary Examiner* — Morshed Mehedi
(74) *Attorney, Agent, or Firm* — Patent Capital Group

(57) ABSTRACT

In an example embodiment, there is disclosed an anti-malware system and method that analyzes applications and other executable objects at the subroutine level. Each subroutine may be assigned an execution frequency score, which may be based on simulated execution in an insulated environment, on real-world operating conditions, or on static analysis. Each subroutine may be assigned an execution frequency score based on how frequently it is executed. Based on this score, each subroutine may also be assigned a reputation score. To aid in cross-referencing to occurrences of the same subroutine in other applications, the subroutine may also be assigned a pseudo-unique identifier, such as a fuzzy fingerprint.

21 Claims, 4 Drawing Sheets

(56) References Cited

U.S. PATENT DOCUMENTS

| | | | |
|---|---|---|---|
| 8,301,605 B2 * | 10/2012 | Gupta | G06F 11/3466 |
| | | | 707/694 |
| 8,332,415 B1 | 12/2012 | Adarsh et al. | |
| 9,235,586 B2 | 1/2016 | Virmani et al. | |
| 9,262,638 B2 * | 2/2016 | Nachenberg | G06F 21/50 |
| 2005/0022016 A1 * | 1/2005 | Shipp | G06F 21/562 |
| | | | 726/4 |
| 2006/0161986 A1 * | 7/2006 | Singh | H04L 63/0245 |
| | | | 726/24 |
| 2008/0168428 A1 * | 7/2008 | Bates | G06F 11/3612 |
| | | | 717/129 |
| 2009/0300761 A1 * | 12/2009 | Park | G06F 21/562 |
| | | | 726/23 |
| 2010/0218253 A1 * | 8/2010 | Sutton | G06F 21/554 |
| | | | 726/23 |
| 2012/0216248 A1 | 8/2012 | Alperovitch et al. | |
| 2013/0097659 A1 * | 4/2013 | Das | G06F 21/629 |
| | | | 726/1 |
| 2013/0097709 A1 | 4/2013 | Basavapatna et al. | |
| 2013/0304900 A1 | 11/2013 | Trabelsi et al. | |
| 2014/0095778 A1 * | 4/2014 | Chung | G06F 12/0246 |
| | | | 711/104 |

FOREIGN PATENT DOCUMENTS

| | | |
|---|---|---|
| JP | 2013537342 A | 9/2013 |
| KR | 101060639 B1 | 8/2011 |
| WO | 2015099756 | 7/2015 |

OTHER PUBLICATIONS

JPO Jul. 25, 2017 JP first Official Action for JP Patent Application No. 2016-542965, 4 pages.

KIPO Jul. 14, 2017 KR Notice of Preliminary Rejection for KR Patent Application No. 2016-7014082, 4 pages.

PCT International Search Report for International Application No. PCT/US2013/077935 dated Sep. 22, 2014.

International Preliminary Report on Patentability in International Application No. PCT/US2013/077935 dated Jun. 28, 2016.

* cited by examiner

FREQUENCY-BASED REPUTATION

CROSS-REFERENCE TO RELATED APPLICATIONS

This Application is a national stage application under 35 U.S.C. § 371 of PCT Application PCT/US2013/077935, filed on Dec. 27, 2013 and entitled "Frequency-Based Reputation". The disclosure of the prior applications is considered part of and is hereby incorporated by reference in its entirety in the disclosure of this application.

FIELD OF THE DISCLOSURE

This application relates to the field of computer network security, and more particularly to a system, apparatus, and method for computing a frequency-based reputation for an object.

BACKGROUND

As used throughout this specification, malicious software ("malware") includes any virus, Trojan, bot, zombie, rootkit, backdoor, worm, spyware, adware, ransomware, dialer, payload, malicious browser helper object, cookie, logger, or similar designed to take a potentially-unwanted action, including by way of non-limiting example data destruction, covert data collection, browser hijacking, network proxy or redirection, covert tracking, data logging, keylogging, excessive or deliberate barriers to removal, contact harvesting, and unauthorized self-propagation. Certain systems, referred to herein as anti-malware systems, focus on identifying and combatting malware at the application or file level. An "executable object" includes any file, program, macro, script, document, record, or similar containing code for executing a program. Apart from being developed to operate as standalone programs, malware may also take a form of malicious code added or injected into other software. One example of this form may be an "infected file" where malicious code is introduced by a parasitic replicating computer virus. Malicious code can also be injected manually or it can be added to the sources of software so that after compilation it will become part of the executable object, or can be added to scripts and interpreted, which may or may not be compiled. Certain anti-malware solutions focus on identifying infected files and then removing, isolating, or otherwise blocking them.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
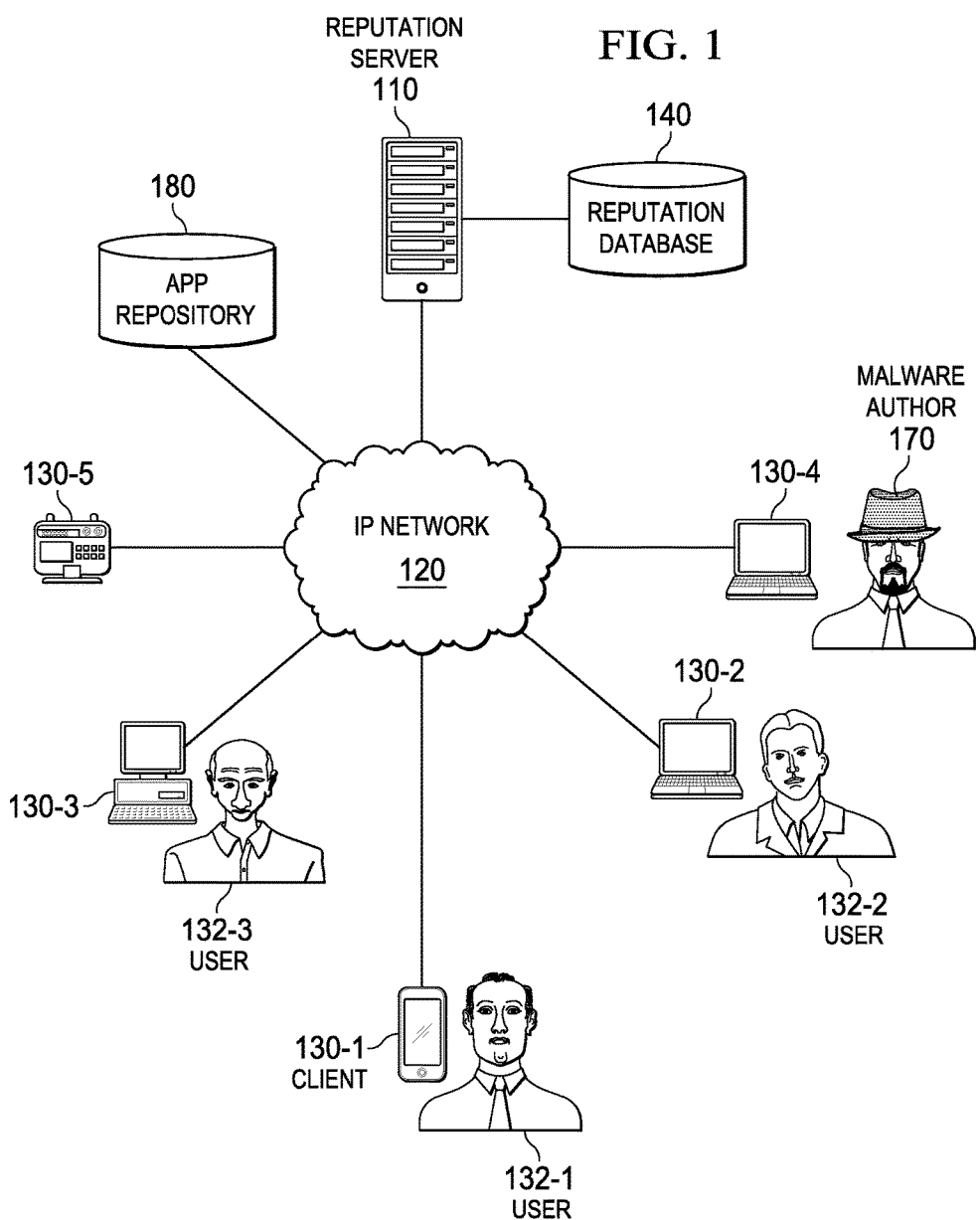
FIG. 1 is a network-level diagram of a distributed reputation environment according to one or more examples of the present specification.

In an example, there is disclosed an anti-malware system and method that analyzes applications and other executable objects at the subroutine level. Each subroutine may be assigned an execution frequency score, which may be based on simulated execution in an insulated environment, on real-world operating conditions, or on static analysis. Each subroutine may be assigned an execution frequency score based on how frequently it is executed. Based on this score, each subroutine may also be assigned a reputation score. To aid in cross-referencing to occurrences of the same subroutine in other applications, the subroutine may also be assigned a pseudo-unique identifier, such as a fuzzy fingerprint.

Embodiments of the Disclosure

Some software ecosystems have migrated toward a model of applications and other executable objects distributed from "app stores" like Google Play, Apple Store and Microsoft Store. In this environment, malware authors may adapt by hiding malicious functionality from the app stores' screening. One potential method that may also be difficult to detect with some anti-malware solutions is to build a useful or desirable program such as a game and inject into it a malicious subroutine that activates only under specific, relatively-rare conditions, for example, to target a relatively-small but desirable class of users (this type of inclusion is sometimes called an "Easter egg"). In this scenario, many users will find that the application operates within expected boundaries and appears useful and enjoyable. These users may give the application good reviews, thus compounding the spread of the hidden malware.

Similarly, malicious code may be injected into legitimate software by means of bribing developers or gaining unauthorized access to a source control system, such as after compromising a computer of a person who has 'write' access to the source code repository. Such concealed malware distribution can be used for mass-scale attacks as well as for targeted attacks, including government-sponsored attacks.

Thus, it may not be optimal in some cases to limit malware identification to the executable object level. Rather, emerging threats may focus on new attack methods, including for example:

Creating infected files by reverse engineering or otherwise modifying existing executable objects to inject malware routines, and providing the modified executable objects to an app store.

Creating a mostly-legitimate executable object to be distributed via an app store, but including therein malware routines that are executed infrequently, making identification of the executable object as malware difficult.

These challenges may be further exacerbated by the use of large development teams and third-party software add-ons.

In one example attack, malware author provides a useful third-party library in object code format. The library may include mostly-legitimate functionality, plus malware payload that executes only infrequently. This infrequent execution may help to mask the malware nature of the library. For example, the library may log financial transactions, and activate only when a user accesses a bank account with more than $100,000 in available funds, whereupon the account is drained. In another example, the malware payload collects private data from the user for sale to marketing entities, but only collects data when a GPS signal is present and when the user is found to be within a zip code selected from a list configured to be large enough to provide useful data but small enough to ensure that the malware payload is executed only infrequently.

This infrequency of execution may help to ensure that the malware library is not easily detected. If the library provides a commonly-used or very useful function, and if it is provided free or inexpensively with liberal licensing terms, then time-crunched developers looking to meet tight deadlines may be enticed into using the library. Thus, the malware library may end up in many different apps, and be distributed to many different devices. Wide, heterogeneous distribution may also make it difficult to identify all instances of the malware library, even after the malicious payload is discovered. For example, the payload may be identified in a first executable object, so that the first executable object is properly quarantined, scrubbed, and re-deployed without the payload. However, without knowing every vendor that has used the library, it is difficult to identify every infected file. Moreover, the library may have an ability to execute or interpret code supplied from an external source, such as a script or instructions from a Web page or commands received via a network connection, by way of non-limiting example. In some cases, static and dynamic analysis are unable to inspect the exact intention of the attacker before such remote control equivalent in some cases to a "bot," "backdoor," or "remote shell" functionality—is exercised.

In a second example attack scenario, malware author procures a copy of a publically available executable object such as an app and reverse engineers or otherwise modifies the app to insert malware behavior. The author may then distribute the app to non-verified third-party app repository, for example, which users may optionally select. In this case, an end user may find that a popular paid app is available free on the third-party app repository, and appears to have all of the original functionality of the desired app. Many users may not be adversely affected because the malware payload only activates under certain conditions. In this case, not every copy of the app need be identified as malware. Rather, only those that have been modified need be flagged.

In a third example attack scenario, malware author may be legally employed by an otherwise legitimate developer of executable objects such as apps. In this case, the user may covertly inject malware behavior into otherwise legitimate apps, and may mask their presence by configuring the malware payload to activate only under certain conditions. In this case, it may be difficult to identify which apps are affected because it may not be clear which apps the malware author worked on or had access to.

The foregoing are offered by way of non-limiting examples in which the system and method of the present specification may usefully be deployed.

According to an example of the present specification, a system and method is provided for identifying malware payload in an executable object that may be (but need not be) otherwise legitimate. In the example, a reputation client parses an executable object into identifiable subroutines, and assigns each subroutine a pseudo-unique identifier such as a fuzzy fingerprint. In this specification, a "subroutine" can include any programming subroutine, routine, procedure, function, method, class, object, module, or similar identifiable portion of code containing executable instructions. It should be noted that a subroutine may not necessarily have a clearly-defined entry point and exit point as in a definite procedure. A malware author could attempt to bury infrequently-executed malicious code within a frequently-executed procedure as a design-around to a system implementing the disclosure of the present specification. Thus, it is anticipated that in some cases, separate branches of a clearly-defined procedure may be separately identified as a procedure so that their execution frequency can be evaluated separately.

Once each subroutine is identified and assigned an identifier, the reputation client either passes the executable object to a reputation server or performs a local analysis, where the executable object is analyzed either actively or passively. Analysis may be in a centralized repository, or distributed across many real-world use cases. Advantageously, data may be aggregated from a plurality of individual clients about granular subroutine-level code execution. Subroutines are provided a rank or score based on how frequently they are executed. When a subroutine is executed frequently without noticeable adverse effects or complaints from users, it may be flagged as less suspicious. When a subroutine is executed infrequently, and in particular where execution is accompanied by reports of "odd" behavior or user complaints, the subroutine may be marked as suspicious. Suspicious subroutines may be quarantined, scrubbed, or in some cases subject to additional detailed analysis such as decompilation and deep analysis by human operators. Advantageously, the subroutine can be identified in any executable object by its identifier. Thus, identification of malware and malware behavior can be decoupled from the identity of a specific executable object.

FIG. 1 is a network-level diagram of a distributed reputation environment according to one or more examples of the present specification. In this example, a plurality of users 132 operate a plurality of client devices 130. It should be noted that each client device may be connected to a network 120, such as the internet, an intranet, WAN, LAN, corporate network, secured network, or similar. Malware author 170 also connects to network 120 via client device 130-4. An app store 180 is provided and is communicatively coupled to network 120. A reputation server 110 connects to network 120 and is communicatively coupled to a reputation database 140. In this embodiment, reputation database 140 is disclosed as being directly connected to reputation server 110, but it will be appreciated that other configurations are possible, including that reputation database 140 may be provided by a third party, may be distributed over multiple devices and may be accessible for example via an application programming interface (API).

In an example, users 132 operate client devices 130. A "client device" can include any type of node, user device, including by way of non-limiting example a computer, a personal digital assistant (PDA), a laptop or electronic notebook, a cellular telephone, an IP telephone, an iPhone™, an iPad™, a Microsoft Surface™, an Android™ phone, a Google Nexus™, or any other device, component, element, or object capable of executing instructions. A "user" can include any person, entity, software, or device capable of operating, using, or otherwise interfacing with a client device. It is expressly anticipated herein that some client devices 130 may operate without human user interaction, for example in the case of remotely-controlled devices, sensors, or embedded systems. For example, client device 130-5 may be an embedded system, remote sensor, network controller, or other device not normally operated by a human user. In the case of client device 130-5, user 132 may be an embedded operating system or an external system that is controlled by, that sends data to, or that receives data from client device 130-5.

In some cases, it may be beneficial to have a plurality of reputation servers 110, or to configure reputation server 110 to separately handle a plurality of species of client devices 130. For example, malware payload executable on Microsoft Windows 7 may not be executable on any of the other devices listed above. Rather, malware payloads may need to be crafted to specifically target specific architectures. This specification expressly anticipates, however, a situation where a single malware payload may be targeted to a plurality of client device 130 platforms. For example, the malware payload may be implementable in a cross-platform language such as Java, and may be able to exploit a security weakness common to a plurality of platforms.

In an example, user 132-1 operates client device 130-1, which may be an Android phone. In this example, a large plurality of other users may also operate similarly-configured Android phones, and have access to app store 180, from which they receive executable objects. Malware author 170 may want to create malware targeted for Android phones, and may do so by one of the example method mentioned above, or by any other suitable method.

Reputation server 110 may be operated, for example, by the operator of app store 180, or by a third-party security provider. Further, reputation database may be operated by the operator of reputation server 110, or may be provided by a third party. In general terms, the entities disclosed in this specification may or may not be separate entities depending on the specific configuration.

Reputation server 110 may be configured to provide reputations for executable objects distributed via app store 180, or for other executable objects distributed by any suitable means. Throughout this specification, a "reputation" can include any datum or data that individually or collectively represent a confidence level related to a decision of whether an executable object or subroutine is, or contains, malware. Further, in the context of this specification, a reputation may be assigned to a subroutine or group of subroutines rather than to an entire executable object.

Figure 2:
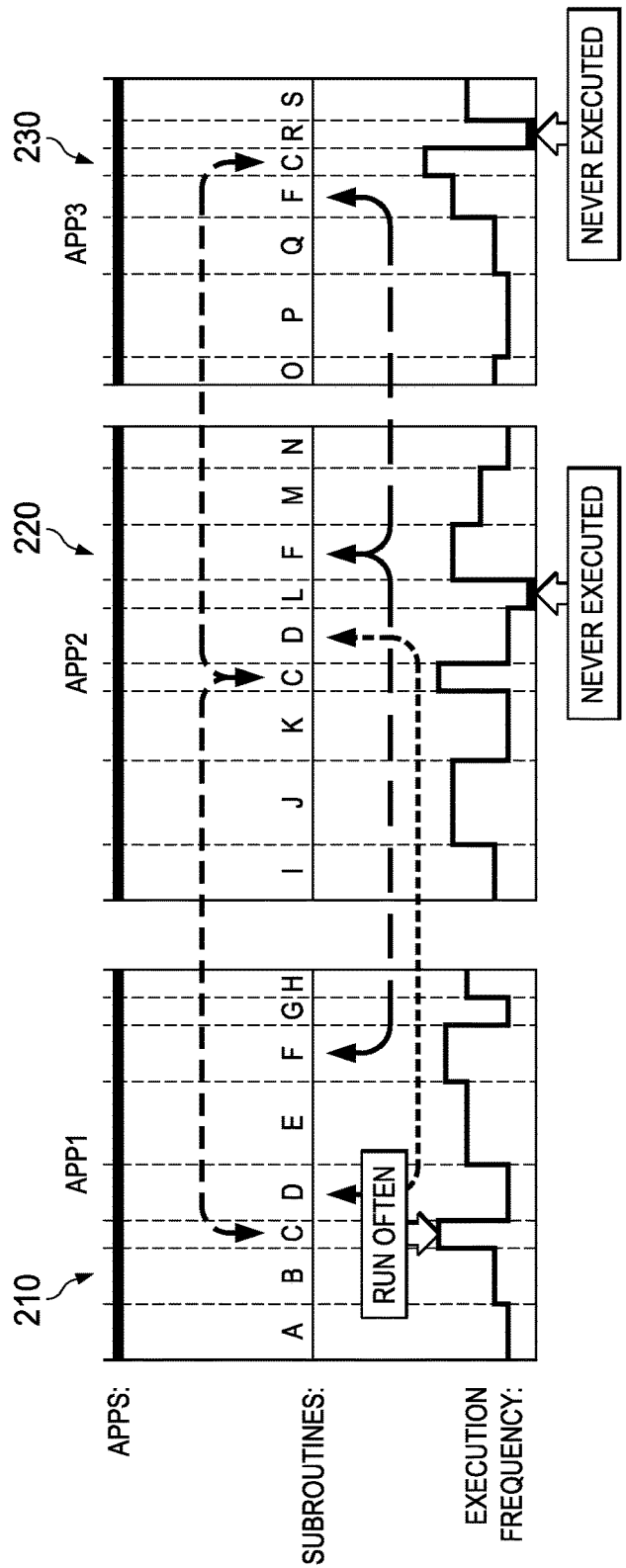
FIG. 2 is a block diagram of a plurality of executable objects containing a plurality of subroutines, including common subroutines, according to one or more examples of the present specification.

FIG. 2 is a block diagram of a plurality of executable objects containing a plurality of subroutines, including common subroutines, according to one or more examples of the present specification. In this example, executable objects 210, 220, and 230 each contain a plurality of subroutines. In this example, executable object 210 includes subroutines A, B, C, D, E, F, G, and H. As the graph below indicates, subroutine C is frequently executed. Subroutines E, F, and H are moderately frequently executed. Subroutine B is infrequently to moderately-frequently executed. And subroutines A and G are infrequently executed.

In executable object 220, subroutines I, J, K, C, D, L, F, M, and N are found. Notably, subroutines C and D are common to executable object 210. As in executable object 210, subroutine C is frequently executed. Subroutines I, J, F, and M are moderately frequently executed. Subroutine N is infrequently executed. And subroutine L is never executed.

In executable object 230, subroutines O, P, Q F, C, R, and S are found. Again, subroutine C is very frequently executed. Subroutine F is once again moderately frequently executed, as is subroutine S. Subroutines O, P, and Q are infrequently executed. And subroutine R is never executed.

In the foregoing example, subroutine C may receive a high reputation (potentially indicating it being legitimate) with a relatively high degree of confidence because it is executed frequently and appears in many applications. Subroutine F may also receive a relatively high reputation because it appears in many applications and is executed moderately frequently. In the context of this specification, a "high reputation" can include any reputation that indicates, to a high degree of confidence, that an executable object or subroutine is legitimate and/or free of malware. A "low reputation" corresponds to a low degree of confidence that an executable object or subroutine is legitimate and/or free of malware, or conversely, a high degree of confidence that the executable object or subroutine is infected with malware. The concept of "high reputation" and "low reputation" are disclosed here to represent at least two opposing points on one or more reputation scales, and are not intended to imply a simple binary reputation classification unless expressly stated herein.

Subroutine D, in contrast to subroutine C, may be relatively suspicious because it appears in more than one application as is executed infrequently. Thus, subroutine D may be flagged for further analysis by a human operator. This may involve, for example, decompilation, simulation, and other deep analysis. If after deep analysis subroutine D is found to be a legitimate subroutine with rarely-needed functionality, it can be manually assigned a high reputation so that other client devices that encounter object D as part of an executable object know that it can be safely executed.

Subroutines L and R, which were never executed, may also be assigned relatively low reputations and flagged for further deep or human analysis. On further analysis, it may be found that subroutine L contains malware, and that subroutine R contains "dead" code that is unmaintained or no longer useful. In this case, both subroutines may receive low reputation scores, and in some embodiments where more fine-tuned control of reputation is available, they may receive different species of reputation scores (e.g. subroutine R may be labeled as "excluded"). For example, subroutine L may be flagged as malicious code. Subroutine R may receive a different flag that identifies it as not malicious, but still a potential security risk, because unused or unmaintained code may contain attack vectors for malware authors. Thus, it may still be desirable to quarantine, disable, report (e.g. as a potential source of software vulnerability) or otherwise protect clients from subroutine R.

In another example, executable object 210 may have a very high overall reputation, for example because it is widely-used software provided by a reputable software vendor, and has been in use for a significant time without substantial malware-related user complaints. In that case, all of subroutines A-H may inherit a high reputation from executable object 210. That reputation may follow those subroutines into other executable objects, such as 220 and 230, even where those subroutines are infrequently executed (such as subroutine D in executable object 220). Thus, in this example, subroutine D will continue to have a high reputation so long as it does not begin actively displaying malware behavior.

Figure 3:
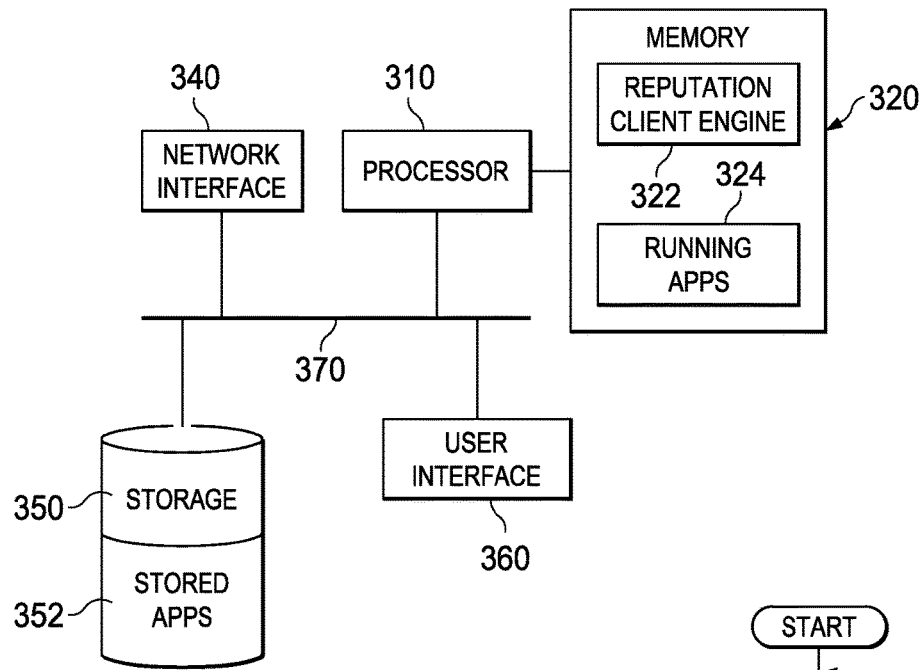
FIG. 3 is a block diagram of a client device 130 according to one or more examples of the present specification.

FIG. 3 is a block diagram of a client device 130 according to one or more examples of the present specification. Client device 130 is controlled by a processor 310, which is communicatively coupled to a memory element 320. In an example, processor 310 is communicatively coupled to other system elements via bus 370. Those elements may include, by way of non-limiting example, a network interface 340, and storage 350, which in some cases may be a species of memory element 320, and a user interface 360. It is expressly intended that any of the above elements can be realized in hardware, software, firmware, or any combination thereof.

Processor 310 is configured to control client device 130, for example via executable software or firmware instructions. A "processor" can include any combination of hardware, software, or firmware providing programmable logic, including by way of non-limiting example a microprocessor, digital signal processor, field-programmable gate array, programmable logic array, application-specific integrated circuit, or virtual machine processor.

Memory 320 may be a relatively low-latency volatile memory in some embodiments, and may include main memory, cache, on-chip memory, L1 memory, L2 memory, or similar. Note that in this embodiment, processor 310 is depicted in a direct memory access arrangement with memory 320, but in other embodiment, memory 320 may communicate with processor 310 via system bus 370, via some other bus, or via some other means. Furthermore, although memory 320 and storage 350 are depicted in this example as physically or conceptually separate devices, it should be appreciated that in some embodiments, memory 320 and storage 350 may share a physical device, which may or may not be divided into separate memory area. Thus, it should be appreciated that the arrangement disclosed here is an example only, and not limiting. Rather, it is expressly intended that even where a memory and storage are spoken of separately, they may be embodied in a single physical or logical device unless expressly stated otherwise.

In this example, network interface 340 includes any communication medium, whether analog, digital, or mixed-signal, that is configured to communicatively couple client device 130 to other computing devices. Network interface 340 may include, by way of non-limiting example, a Wi-Fi, Ethernet, Firewire, fiberoptic, USB, serial interface, infrared, cellular network, digital PCS networks, 2G data network, 3G data network, 4G WiMAX, or 4G LTE data networks.

In some embodiments, a user interface 360 may be provided to aid a user in interacting with client device 130. A "user interface" can include any combination of hardware, software, and firmware configured to enable a user to interact with client device 130, whether or not in real-time. In the example, user interface 360 may include, by way of non-limiting example, a keyboard, mouse, display monitor, speaker, microphone, touch-sensitive display, which may act as a combined input/output device, and a camera. User interface 360 may include software services such as a graphical user interface, including real-time dialog boxes that solicit input or confirmation from a user.

Storage 350 is disclosed as an example of a non-volatile memory medium, which may be a species of memory 320. In some embodiments, memory 320 and storage 350 may be separate devices, with memory 320 being a relatively low-latency volatile memory device, and storage 350 being a relatively high-latency non-volatile memory device. Storage 350 may also be another device, such as a hard drive, solid-state drive, external storage, redundant array of independent disks (RAID), network-attached storage, optical storage, tape drive, backup system, or any combination of the foregoing. Many other configurations are also possible, and are intended to be encompassed within the broad scope of this specification.

In an example, memory 320 has stored therein executable instructions operable to provide a reputation client 322 as described herein. Memory 320 may also have executable objects in a state of execution, such as running apps 324. Storage 350 may also include executable objects, which may be in a dormant or static state. Reputation client engine 322 may be configured to analyze both running apps 324 (in memory 320) and stored apps 352 (data at rest in storage 350) according to methods disclosed herein. In some embodiments, reputation client engine 322 may be provided by executable instructions loaded from storage 350 (for example, as part of stored apps 352) into memory 320 for execution. The instructions may be configured to instruct processor 310 to provide client reputation services as described herein, for example by performing the method of FIG. 4. In yet other embodiments, reputation client engine 322 may be provided inside a hypervisor, on a virtual machine, or other suitable virtualization platform, or as any combination of dedicated or special-purpose hardware, software, and/or firmware configured to carry out a suitable method, such as the method of FIG. 4. In the same or another embodiment, reputation client engine 322 may operate in a dedicated memory and may execute on a separate processor or other trusted execution environment, to provide better isolation from the rest of client device 130. This may help to prevent both malicious and accidental manipulation of reputation client 322 by malware or software.

Figure 4:
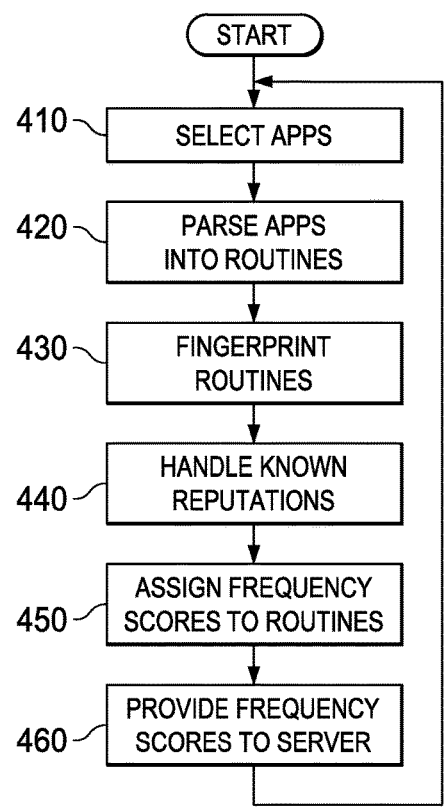
FIG. 4 is a flow diagram of an example process carried out by a reputation client according to one or more examples of the present specification.

FIG. 4 is a flow diagram of an example method of providing a reputation client engine according to one or more examples of the present specification. Reputation client 322 is disclosed in FIG. 3 as running on client device 130, but it should be noted that reputation client may run on reputation server 110, or on any other device. The steps disclosed herein may also be split across multiple devices in certain embodiments. For example, some of the steps disclosed herein may be performed on client device 130, while others may be offloaded to reputation server 110 to preserve batter or processing power on client device 130.

In this example, reputation client 322 executes on client device 130, representing a "reactive" screening model. In this model, executable objects may be deployed to a plurality of client devices 130 without an existing reputation. As the executable objects are executed on the client devices 130, execution profiles are built to update the executable object's reputation. In other embodiments, both reputation server 110 and client device 130 may perform the method of FIG. 4, wherein reputation server 110 performs a static analysis to provide a baseline identification, and client device 130 performs a dynamic analysis to assign the reputation.

Many other combinations will occur to those having skill in the art, and it is intended that they be encompassed within the broad scope of this specification. It should further be noted that the steps of the method of FIG. 4, and other methods in this specification, are disclosed in a particular order by way of example only, and that the order of the steps taken may be arbitrarily rearranged except where explicitly stated otherwise, or where the context of the disclosure makes it unambiguously clear that one step must follow another step. Furthermore, in a case where one step expressly or necessarily follows another, it is not intended to imply that the second step must directly or immediately occur after the first step, that intervening steps must occur, or that the second step must be a direct, immediate, uninterrupted result of the first step, or that the second step cannot occur but for the first step.

In this example, in block 410 reputation client 322 may first select all executable objects, including for example apps, available for analysis on client device 130. Selecting step 410 may also comprise selecting at least one executable object based on at least one property, event or context (e.g. selecting a downloaded app before it is installed). This may include one or all of running apps 324, stored apps 352, or any executable object that a user desires to store in storage 350. Selecting may also include, for example, creating or updating a database of resident apps, and may include an initial overall reputation for each executable object. Initial reputations may be initialized to a "zero" state in one example, or may be received from reputation server 110 in another non-limiting example. Cataloging may also include provisioning a memory space or structure for creating and associating with apps reputations for individual subroutines.

In block 420, each executable object is parsed into individual subroutines. This may include, for example, collecting field telemetry representing the execution profile of the executable object via hooking entry points of functions, via complete execution trace wherein all EIPs are recorded, or via recording access to memory pages, by way of non-limiting example. The latter may be provided in one example by Intel trusted memory services layer (TMSL), or commercial products available from McAfee, Inc., including DeepSAFE or DeepDefender. Parsing individual subroutines may further comprise identifying code sections found more than once, via standard compiler skeletons for functions, via analysis of a call-flow graph after decompilation, or other suitable methods.

A static approach to parsing may include identifying instructions that are commonly executed at the entry point of a subroutine, such as PUSH BP followed by MOV BP,SP. The end of a subroutine may likewise be identified via instructions commonly found at the end of a subroutine, such as POP BP followed by RET. In another example, reputation client 322 may decompile the executable object and reconstruct the flow graph.

Further dynamic approaches may include monitoring CPU branching (CALL, RET, JMP instructions) or monitoring the stack for return addresses. There are also mechanisms like branch tracing and breakpoints (hardware and software) to assist in reconstructing call flows built into certain processors, such as Intel processors. It should be recognized however that the foregoing are all disclosed only as non-limiting examples, and that there are many other possible methods for parsing and identifying subroutines, which are intended to be encompassed in the broad scope of this specification.

Parsing may also involve creating a modified copy of the executable object for analysis. In that case, certain subroutines may be modified to inject frequency counters (or calls to routines that do the counting) that are updated each time the subroutine is executed.

Once each subroutine has been identified, in block 430 each subroutine is fingerprinted, meaning it is assigned a pseudo-unique identifier as described above. This may include, for example, computing a cryptographic hash of each subroutine. Notably, a cryptographic hash will match only when subroutines are strictly identical, which may be the case many units of common code compiled with the same compiler options. Modern hashes such as SHA2 or SHA3 are suitable to avoid most collisions, which will help the pseudo-unique nature of the hash approach true uniqueness. Thus, it should be noted that as used in this specification, "pseudo-unique" refers to an identifier that is nearly-unique enough for the purposes of the application in which it is used, and that need not be, though it may be, truly unique, or characterized by statistically extremely low probability of collision.

Strong hashes will not, however, identify code that is identical except for trivial modifications, including simply compiling the same source code with different compiler options. In an example, to improve matching of substantially-identical-but-slightly-different subroutines, "fuzzy hashing" or "fuzzy fingerprinting" may be used. For example, to match textual strings better they may be converted to all uppercase or all lowercase. To match Intel/AMD x32/x64 code memory references may be removed and replaced, for example, with zeroes or with sequential numbers, leaving only CPU opcodes to be hashed. For example, instead of MOV AX,[1234] followed by ADD AX,[2345], the fuzzy fingerprint would hash MOV AX,[0] followed by ADD AX,[1]. This and similar approaches may improve matching of slightly modified code portions.

Other fuzzy hashing techniques may also be used, such as for example SSDEEP, which uses context-triggered piecewise hashes (CTPH). A dictionary of common substrings found in different subroutines may also be built, and subroutines may be matched based on size and frequency of common substrings.

To make identification of subroutines more robust, it may be beneficial to perform tamper-free fingerprinting to avoid a possibility of active malware interference with the process. This can be achieved, for example, by executing the hashing or fingerprinting inside a trusted execution environment (TEE) such as a hypervisor, OS kernel, or inside Intel Secure Guard Extension SGX, inside Intel vPro, in a secure element or in firmware, by way of non-limiting example. Another way to strengthen the hashing step may include transmitting the object for hashing via a secure network connection to another trusted computer, such as reputation server 110. In some embodiments the entire reputation client 322 may be placed into TEE.

It should be noted that the fingerprinting techniques disclosed here are given as non-limiting examples only, and it is intended that any suitable technique for fingerprinting subroutines should be included in the broad scope of this specification.

In block 440, reputation client handles known reputations. These known reputations may be the result of prior iterations of the method, or may be received from reputation server 110. The handling may include, by way of non-limiting example, assigning known or previously-computed reputation scores to certain subroutines or executable objects. For executable objects marked as malware, the object may be quarantined, deleted, disabled, or otherwise remedied. For otherwise-legitimate executable objects that contain malware, remedial steps may be taken, including for example de-linking the offending subroutine from the executable object, reconfiguring permissions to block access to sensitive resources, replacing the subroutine with a "scrubbed" version of the subroutine stripped of malicious behavior, providing the subroutine with simulated data to prevent it from executing, or otherwise preventing the subroutine from committing harmful acts. For example, if the subroutine only activates when it finds that the user is in certain zip codes, the subroutine can be consistently fed a false zip code that is not in the list. Where the method has been instituted with sufficient granularity, this may be done even when the executable object otherwise needs access to legitimate GPS data to perform desirable functions for the user. In those cases, the false geographic data may be fed only to the affected subroutine, not to the executable object as a whole.

In block 450, frequency scores are assigned to the identified subroutines. Frequency may include the number of times a subroutine is executed during use, and may also include a static analysis of the number of calls to the subroutine within an executable object. Thus, it is expressly anticipated herein that a frequency may include a plurality of factors and may derive from a combination of those plurality of factors. It is further anticipated that a reputation may include weighting for different frequency factors. For example, the number of times a subroutine is actually executed may be relatively more important than the number of static calls to the subroutine. Thus, one example reputation algorithm may include assigning a weighted average to the total number of times actually executed and the total number of static calls. In another example reputation algorithm, the two factors may be tracked separately and a confidence level may be based on whether one or both is above or below respective thresholds. In yet another example, the number of different applications in which a subroutine appears may provide another confidence indicator for a subroutine. For example, if the subroutine appears in many different applications, and is executed very infrequently across all applications, it may be flagged as a suspicious subroutine and subjected to additional human analysis. In another example, a subroutine that appears in many different applications and is executed frequently across all applications may receive a reputation as less suspicious. The frequency and severity of user complaints, particularly where correlated with execution of specific subroutines, may also be a frequency factor considered in the present specification. Note that in certain embodiments, reputation client 322 may provide only raw frequency scores, while in other embodiments, reputation client 322 may calculate reputation scores based on frequency scores.

Calculating a frequency score may also involve special equipment or instrumentation in some embodiments. For example, certain devices may be equipped with appropriate hardware support for processor or memory monitoring, including for example the Intel TMSL library, breakpoints or CPU branching history. In another example, frequency data are collected via code coverage telemetry. In this example, frequency data may be collected either from client devices 130 or during a pre-screening process in an insulated environment, including by way of non-limiting example, a virtualized environment, inside a sandbox or hypervisor, or inside an emulator. This may insulate the executable object from the target system, which may be particularly useful where the executable object does not yet have a reputation score. In one embodiment insulated environment may be coupled directly to reputation server 110 and perform analysis on unknown apps to create reputations for them. Execution in the insulated environment may be enhanced by providing simulated private user data or user inputs, which may aid in identifying malware behavior. An example of such simulations is provided in co-pending U.S. application Ser. No. 13/723,495, entitled "User-Driven Emulation of Applications," filed 21 Dec. 2012, which is incorporated herein by reference. For example, while in the insulated environment, the executable object may be provided with simulated private user data including location data, contact lists, keystrokes, or personal details. Simulated private user data may also include simulated background tasks on which the executable object may try to "spy" such as accessing banking, financial, medical, or social networking sites or resources.

To conserve battery power on mobile devices, frequency calculation may be limited to when the device is plugged into an external power source.

In yet another example, frequency scores may be associated with selected branches (collection of the leaves invoked from one higher-level subroutine) of a call-flow graph in addition (or instead of) from a multitude of "leaves" portions of code. This may provide additional hierarchical frequency tracking for both a parent routine and its children. This may aid in calculating reputations for software that includes multiple components, such as an executable file that makes calls to dynamic link libraries or shared object files. In an example, the executable object and all libraries, as well as their functions and exports, may be accounted for in the frequencies.

In block 460, frequency scores are provided to reputation server 110. It should be noted, however, that provision of raw frequency scores is disclosed herein only as a non-limiting example, and that in some embodiments, block 450 may include computation of actual reputation scores, in which case reputations may be used strictly internally, or computed for forwarding to reputation server 110.

In block 460, computed frequency scores (or reputation scores) may be provided to reputation server 110 for aggregation with other scores received from other devices.

In certain embodiments, the method may return to block 410 for selecting of additional executable objects, or further refinement of data collected on existing executable objects.

Figure 5:
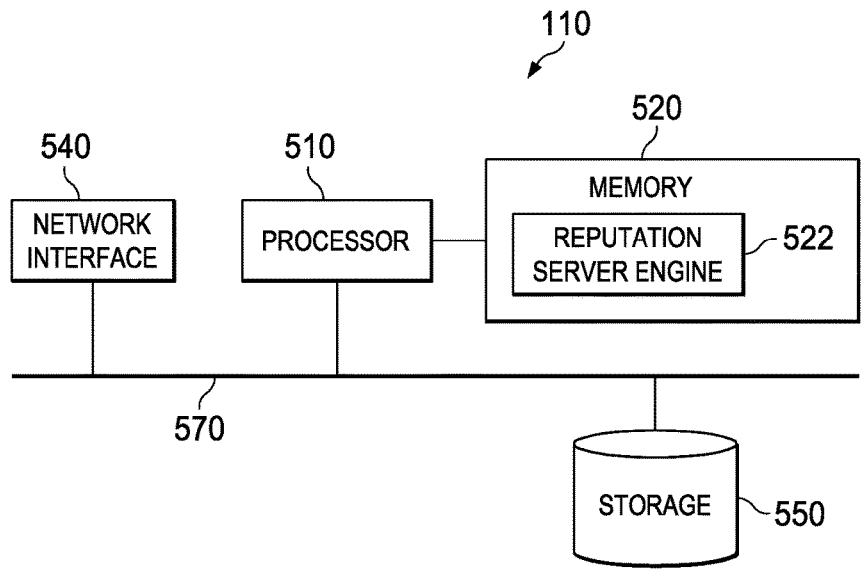
FIG. 5 is a block diagram of a reputation server according to one or more examples of the present specification.

FIG. 5 is a block diagram of reputation server 110 according to one or more examples of the present specification. In this example, reputation server 110 is controlled by a processor 510. A memory 520 is communicatively coupled to processor 510. Other system components of reputation server 110 connect to processor 510 via system bus 570. Reputation server 110 may also include a storage 550 and network interface 540. Processor 510 may be similar to processor 310 of FIG. 3. Likewise, memory 520 may be similar to memory 320, storage 550 may be similar to storage 350, and network interface 540 may be similar to network interface 340.

In this example, network interface 540 may be configured to communicatively couple reputation server 110 to network 120. In some cases, storage 550 may include reputation database 140, while in other cases reputation database 140 may be provided separately.

Memory 520 may have stored therein reputation server software 522. In some embodiments, reputation server engine 522 may be provided by executable instructions loaded from storage 550 into memory 520 for execution. The instructions may be configured to instruct processor 510 to provide client server services as described herein, for example by performing the method of FIG. 6. In yet other embodiments, reputation server engine 522 may be provided inside a hypervisor, on a virtual machine, or other suitable virtualization platform, or as any combination of dedicated or special-purpose hardware, software, and/or firmware configured to carry out a suitable method, such as the method of FIG. 6. In the same or another embodiment, reputation server engine 522 may operate in a dedicated memory and may execute on a separate processor or other trusted execution environment, to provide better isolation from the rest of reputation server 110.

Figure 6:
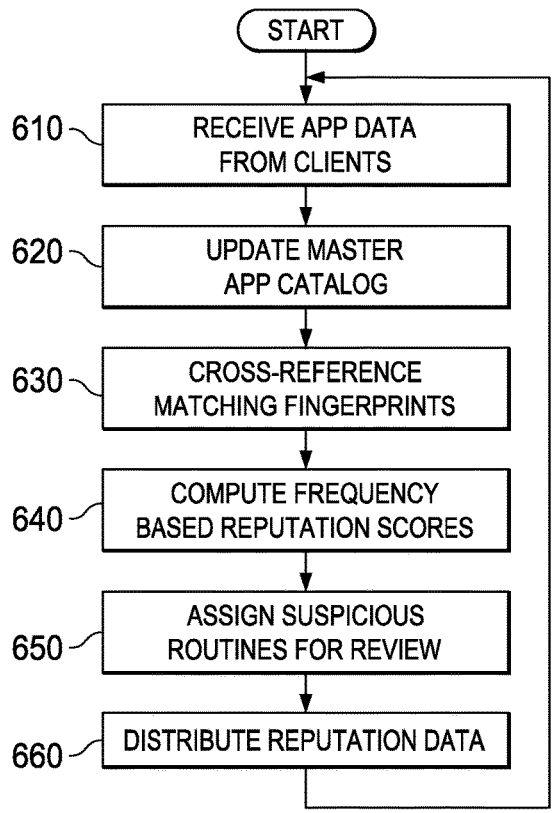
FIG. 6 is a flow diagram of a method of providing a reputation server according to one or more examples of the present specification.

FIG. 6 is a flow diagram of a method of providing a reputation server engine according to one or more examples of the present specification. According to the example, in block 610, reputation server 110 receives data from one or more client devices 130. The data may include, for example, frequency scores or reputation scores for executable objects and subroutines.

In block 620, a master catalog (which in an example covers both full executable objects and subroutines) may be updated, for example as contained in reputation database 140. The updating may include adding apps or subroutines not previously found in the master app catalog, or otherwise preparing the master catalog to hold data about executable objects and subroutines received from client devices 130.

In block 630, executable objects and subroutines may be cross-referenced to existing executable objects and subroutines in reputation database 140, allowing them to be identified as matches. In block 640, reputation scores are computed based on frequency, and reputation database 140 may be updated with the new reputation score. As noted above, in some cases, a client device 130 may have computed a reputation score locally. In that case, a "global" reputation score may be computed based on reputation scored provided by client devices. In other embodiments, reputation scores provided by client devices 130 may be discarded in favor of a global reputation score computed by reputation server 110. It should be appreciated that many algorithms are possible for computing a reputation score on reputation server 110, and the scope of this specification, including the appended claims, is not intended to be limited to any specific algorithm unless expressly stated.

In some embodiments, a reputation score may also account for a reputation of a corresponding developer or team. For example, a developer who has left the company, is under suspicion, has been arrested, has known ties to malicious software organizations, or who otherwise has a personal reputation for being suspicious may warrant additional scrutiny for code he or she developed. In some cases, cooperation from software development firms may be beneficial. Similar considerations may apply to third-party sources of code, such as external libraries, subcontractors, and open-source projects by way of non-limiting example. For example, commit records from a concurrent versioning system (CVS) may be used to determine which developers committed which subroutines. Frequency and reputation data may also be provided back to software development firms via an API, which may help the firms to improve their development process and gain greater insight into their own development processes.

In block 650, a certain class of subroutines or executable objects may be designated as "suspicious," for example based on having a low frequency-based reputation score. These may be designated for further deep analysis, for example by a human operator. If deep analysis from a human operator reveals these subroutines and executable objects as containing malicious code, they may be flagged as malware, and remedial steps may be taken.

In block 660, reputation data for known objects may be distributed back out to client devices 130. The reputation information may also be provided via API and as a service via network. In some embodiments, execution may then return to block 610 for processing of additional subroutines and executable objects.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, Python, Perl, JavaScript or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, dividers, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

EXAMPLE EMBODIMENT IMPLEMENTATIONS

By way of non-limiting example, there is disclosed herein as example 1 an apparatus for performing frequency-based classification of executable objects, comprising a processor communicatively coupled to a memory; a network interface; and a reputation client engine communicatively coupled to the processor, and operable to parse an executable object into a plurality of subroutines; and assign an execution frequency score to each subroutine.

There is disclosed herein as example 2, the reputation client of example 1, wherein the reputation client engine is further operable to provide the execution frequency scores on the network interface; and receive a reputation score for the executable object over the network interface.

There is disclosed herein as example 3, the reputation client of example 1 or 2, wherein the assigning an execution frequency score to each subroutine further comprises running the executable object and tallying calls to the subroutines.

There is disclosed herein as example 4, the reputation client of any of examples 1-3, wherein the reputation client engine is further operable to run the executable object in an insulated environment.

There is disclosed herein as example 5, the reputation client of any of examples 1-4, wherein the parsing the executable object into a plurality of subroutines further comprises modifying a copy of the executable object to inject frequency counters into the subroutines.

There is disclosed herein as example 6, one or more non-transitory computer-readable mediums having stored thereon executable instructions operable to instruct a processor to provide the reputation client engine of any of examples 1-5.

There is disclosed herein as example 7, a reputation server comprising a processor communicatively coupled to a memory; a network interface; and a reputation server engine communicatively coupled to the processor and operable to parse an executable object into a plurality of subroutines; and assign a reputation score to each subroutine;

There is disclosed herein as example 8, the reputation server of example 7, wherein the reputation server engine is further operable to compute a reputation score for the executable object based at least in part on the reputation scores for the plurality of subroutines; and distribute at least one of the reputation scores to a plurality of reputation clients via the network interface.

There is disclosed herein as example 9, the reputation server of example 8 or 9, wherein the assigning a reputation score to each subroutine further comprises assigning an execution frequency score to each subroutine.

There is disclosed herein as example 10, the reputation server of any of examples 8-9, wherein parsing the executable object into a plurality of subroutines further comprises receiving from a reputation client data concerning the plurality of subroutines.

There is disclosed herein as example 11, the reputation server of any of examples 8-10, wherein assigning a reputation score to each subroutine further comprises receiving an execution frequency score for each subroutine from a reputation client.

There is disclosed herein as example 12, the reputation server of any of examples 8-11, wherein assigning a reputation score to each subroutine further comprises assigning each subroutine a pseudo-unique fingerprint; and using the pseudo-unique fingerprint to query a reputation database for a frequency or reputation score for a matching subroutine.

There is disclosed herein as example 13, the reputation server of any of examples 8-12, wherein assigning a reputation score to each subroutine further comprises receiving an execution frequency score for the subroutine, the execution frequency score comprising execution frequency across a plurality of executable objects.

There is disclosed herein as example 14, the reputation server of any of examples 8-13, wherein the reputation server engine is further operable to run the executable object inside an insulated environment; and assign subroutines frequency scores based on their execution frequencies.

There is disclosed herein as example 15, the reputation server of any of examples 8-14, wherein assigning a reputation score to each subroutine further comprises statically analyzing the executable object.

There is disclosed herein as example 16, the reputation server of any of examples 8-15, wherein the reputation server engine is further operable to flag executable objects with low reputation scores for additional deep analysis.

There is disclosed herein as example 17, the reputation server of any of examples of 8-16, wherein the reputation for the executable object is based at least in part on the reputations of the plurality of subroutines.

There is disclosed herein as example 18, the reputation server of any of examples 8-17, wherein the reputation server engine is further operable to determine that the executable object has a high reputation score; and assign the plurality of subroutines a high reputation score.

There is disclosed herein as example 19, the reputation server of any of examples 8-18, wherein the reputation server engine is further operable to assign a pseudo-unique fingerprint at least one subroutine; compute an execution frequency score for the subroutine across a plurality of executable objects; and correlate the reputation score to the execution frequency score.

There is disclosed herein as example 20, the reputation server of example 19, wherein assigning a pseudo-unique fingerprint to the subroutine comprises computing a fuzzy fingerprint.

There is disclosed herein as example 21, the reputation server of any of examples 8-20, wherein the reputation server engine is further operable to identify subroutines with an execution frequency score of zero as security risks.

There is disclosed herein as example 22, the reputation server of any of examples 8-21, wherein the reputation server engine is further operable to identify subroutines with low execution frequency scores as suspect.

There is disclosed herein as example 23, at least one non-transitory computer-readable storage medium having stored thereon executable instructions operable to provide the reputation server engine of any of examples 8-22.

There is disclosed herein as example 24, a method for computing a reputation of an executable object, the method executable on a computing device and comprising parsing an executable object into a plurality of subroutines; assigning each subroutine an execution frequency score; assigning each subroutine a reputation score based at least in part on the execution frequency score; and assigning the executable object a reputation score based at least in part on the reputation scores of the subroutines.

There is disclosed herein as example 25, the method of example 24, wherein assigning the executable object a reputation score further comprises assigning a pseudo-unique identifier to a subroutine; finding subroutines with the same pseudo-unique identifier having previously-calculated execution frequencies; and aggregating the execution frequencies of the subroutine.

There is disclosed herein as example 26, a method of providing a reputation server engine comprising parsing an executable object into a plurality of subroutines; and assigning a reputation score to each subroutine.

There is disclosed herein as example 27, the method of example 26 further comprising assigning the executable object a reputation, wherein the reputation for the executable object is based at least in part on the reputations of the subroutines.

There is disclosed herein as example 28, the method of example 26 or 27, further comprising flagging executable objects with low reputation scores for additional deep analysis.

There is disclosed herein as example 29, the method of any of examples 26-28, wherein assigning a reputation score to each subroutine comprises assigning an execution frequency score to each subroutine.

There is disclosed herein as example 30, the method of any of examples 26-29, wherein the instructions operable to assign a reputation score to each subroutine are further operable to determine that the executable object has a high reputation score; and assign the subroutines a high reputation score.

There is disclosed herein as example 31, the method of any of examples 26-30, wherein the instructions operable to assign a reputation score for each subroutine are further operable to assign a pseudo-unique fingerprint to the subroutine; compute an execution frequency score for the subroutine across a plurality of executable objects; and correlate the reputation score to the execution frequency score.

There is disclosed herein as example 32, the method of example 31, wherein assigning a pseudo-unique fingerprint to the subroutine comprises computing a fuzzy fingerprint.

There is disclosed herein as example 33, the method of any of examples 26-32, further comprising flagging subroutines with low reputation scores for additional deep analysis.

There is disclosed herein as example 34, the method of any of examples 26-33, further comprising assigning an execution frequency score to each subroutine; and identifying subroutines with execution frequency scores of zero as security risks.

There is disclosed herein as example 35, the method of example 34, further comprising identifying subroutines with low execution frequency scores as suspect.

There is disclosed herein as example 36, the method of any of examples 26-34, further comprising running the executable object in an insulated environment.

There is disclosed herein as example 37, an apparatus comprising means for performing the method of any of examples 26-36.

There is disclosed herein as example 38, the apparatus of example 37, wherein the means comprises a processor and memory.

There is disclosed herein as example 39, the apparatus of example 37 or 38, wherein the memory comprises machine-readable instructions, that when executed cause the apparatus to perform the method of any of examples 26-36.

There is disclosed herein as example 40, the apparatus of any of examples 37-39, wherein the apparatus is a computing system.

There is disclosed herein as example 41, one or more non-transitory computer-readable mediums having stored thereon executable instructions operable to instruct a processor to carry out the method of any of examples 26-36.

There is disclosed herein as example 42, a computing device comprising means for parsing an executable object into a plurality of subroutines; means for assigning each subroutine an execution frequency score; means for assigning each subroutine a reputation score based at least in part on the execution frequency score; and means for assigning the executable object a reputation score based at least in part on the reputation scores of the subroutines.

There is disclosed herein as example 43, the computing device of example 42, wherein the means for assigning the executable object a reputation score further comprise means for assigning a pseudo-unique identifier to a subroutine; means for finding subroutines with the same pseudo-unique identifier having previously-calculated execution frequencies; and means for aggregating the execution frequencies of the subroutine.

There is disclosed herein as example 44, the computing device of example 42 or 43, wherein each of the means comprise executable instructions stored on a non-transitory computer-readable medium.

The invention claimed is:

1. An apparatus for performing frequency-based classification of executable objects, comprising:
  a hardware platform comprising a processor communicatively coupled to a memory;
  a network interface; and
  a reputation client engine to operate on the hardware platform, and configured to:
    parse an executable object into a plurality of subroutines;
    assign a pseudo-unique identifier to a subroutine;
    find subroutines with the same pseudo-unique identifier having previously-calculated execution frequencies;
    aggregate the execution frequencies of the subroutines;
    assign an execution frequency score to each subroutine according to the aggregated execution frequencies;
    provide the execution frequency scores to a service via the network interface; and
    receive via the network interface a reputation score for the executable object based at least in part on the execution frequency scores of the subroutines of the executable object.

2. The apparatus of claim 1, wherein the assigning an execution frequency score to the subroutines further comprises running the executable object and tallying calls to the subroutines.

3. The apparatus of claim 1, wherein the reputation client engine is further operable to run the executable object in an insulated environment.

4. The apparatus of claim 1, wherein the parsing the executable object into a plurality of subroutines further comprises modifying a copy of the executable object to inject frequency counters into the subroutines.

5. A reputation server comprising:
  a hardware platform comprising a processor communicatively coupled to a memory;
  a network interface; and
  a reputation server engine to operate on the hardware platform and configured to:
    parse an executable object into a plurality of subroutines;
    assign a pseudo-unique identifier to a subroutine;
    find subroutines with the same pseudo-unique identifier having previously-calculated execution frequencies;
    aggregate the execution frequencies of the subroutines;
    determine an execution frequency for each subroutine according to the aggregated execution frequencies;
    assign a reputation score to each subroutine based at least in part on the execution frequency for the subroutine; and
    assign the executable object a reputation score based at least in part on the reputations of the subroutines.

6. The reputation server of claim 5, wherein the reputation server engine is further operable to:
  compute a reputation score for the executable object based at least in part on the reputation scores for the plurality of subroutines; and
  distribute at least one of the reputation scores to a plurality of reputation clients via the network interface.

7. The reputation server of claim 6, wherein assigning a reputation score to each subroutine further comprises assigning an execution frequency score to each subroutine.

8. The reputation server of claim 6, wherein parsing the executable object into a plurality of subroutines further comprises receiving from a reputation client data concerning the plurality of subroutines.

9. The reputation server of claim 6, wherein assigning a reputation score to each subroutine further comprises receiving an execution frequency score for each subroutine from a reputation client.

10. The reputation server of claim 6, wherein assigning a reputation score to each subroutine further comprises:
  assigning each subroutine a pseudo-unique fingerprint; and
  using the pseudo-unique fingerprint to query a reputation database for a frequency or reputation score for a matching subroutine.

11. The reputation server of claim 6, wherein assigning a reputation score to each subroutine further comprises receiving an execution frequency score for each subroutine, the execution frequency score comprising execution frequency across a plurality of executable objects.

12. The reputation server of claim 6, wherein the reputation server engine is further operable to:
   run the executable object inside an insulated environment; and
   assign subroutines frequency scores based on their execution frequencies.

13. The reputation server of claim 6, wherein assigning a reputation score to each subroutine further comprises statically analyzing the executable object.

14. The reputation server of claim 6, wherein the reputation server engine is further operable to flag executable objects with low reputation scores for additional deep analysis.

15. The reputation server of claim 6, wherein the reputation for the executable object is based at least in part on the reputations of the plurality of subroutines.

16. The reputation server of claim 6, wherein the reputation server engine is further operable to:
   determine that the executable object has a high reputation score; and
   assign the plurality of subroutines a high reputation score.

17. The reputation server of claim 6, wherein the reputation server engine is further operable to:
   assign a pseudo-unique fingerprint to at least one subroutine;
   compute an execution frequency score for the at least one subroutine across a plurality of executable objects; and
   correlate the reputation score to the execution frequency score.

18. The reputation server of claim 17, wherein assigning a pseudo-unique fingerprint to the at least one subroutine comprises computing a fuzzy fingerprint.

19. The reputation server of claim 6, wherein the reputation server engine is further operable to identify subroutines with an execution frequency score of zero as security risks.

20. The reputation server of claim 6, wherein the reputation server engine is further operable to identify subroutines with low execution frequency scores as suspect.

21. A method for computing a reputation of an executable object, the method executable on a computing device and comprising:
   parsing an executable object into a plurality of subroutines;
   assigning a pseudo-unique identifier to a subroutine;
   finding subroutines with the same pseudo-unique identifier having previously-calculated execution frequencies;
   aggregating the execution frequencies of the subroutines;
   assigning to each subroutine an execution frequency score according to the aggregated execution frequencies;
   assigning to the subroutines a reputation score based at least in part on the execution frequency score; and
   assigning the executable object a reputation score based at least in part on the reputation scores of the subroutines.

* * * * *